US006476832B1

(12) United States Patent
Park

(10) Patent No.: US 6,476,832 B1
(45) Date of Patent: Nov. 5, 2002

(54) WINDOWS DISPLAY METHOD AND APPARATUS FOR THE LEFT-HANDED MOUSE

(75) Inventor: Seong-Kook Park, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/329,296

(22) Filed: Jun. 10, 1999

(30) Foreign Application Priority Data

Jun. 10, 1998 (KR) ........................................... 98-21467

(51) Int. Cl.[7] ............................................... H03M 11/00
(52) U.S. Cl. ....................................... 345/789; 345/163
(58) Field of Search ................................ 345/856–862, 345/781, 788, 789, 163–167, 786

(56) References Cited

U.S. PATENT DOCUMENTS 4,931,987 A 6/1990 Kawakami
5,163,130 A * 11/1992 Hullot ........................ 345/782
5,339,391 A 8/1994 Wroblewski et al.
5,377,317 A * 12/1994 Bates et al. ................. 345/781
5,402,152 A 3/1995 Needham
5,428,368 A * 6/1995 Grant ......................... 345/163
5,648,798 A * 7/1997 Hamling ..................... 345/163
5,936,555 A * 8/1999 Zagnoev ...................... 341/22

FOREIGN PATENT DOCUMENTS

JP 3-237492 10/1991

* cited by examiner

*Primary Examiner*—Steven Sax
(74) *Attorney, Agent, or Firm*—Robert E. Bushnell, Esq.

(57) ABSTRACT

A method for displaying on-screen windows for use in a graphic user interface environment is provided. This method is carried out in a computer system using a mouse device, the method is made up of: determining whether the mouse button setting has been made for the right-hand operating mode or the left-hand operating mode; and creating a left-hand mode window in which control buttons thereof are placed generally at the left side of windows if the mouse button setting is for the left-hand mode. As usual, the method further comprises the step of creating a window in which control buttons thereof are placed generally at the right side of the window, if the mouse button has set for the right-hand mode.

5 Claims, 4 Drawing Sheets

WINDOWS DISPLAY METHOD AND APPARATUS FOR THE LEFT-HANDED MOUSE

CLAIM OF PRIORITY

This application makes reference to, incorporates the same herein, and claims all benefits accruing under 35 U.S.C. §119 from an application for *Windows Display Method For The Left-Handed Mouse* earlier filed in the Korean Industrial Property Office on the Jun. 10, 1998 and there duly assigned Ser. No. 21467/1998.

FIELD OF THE INVENTION

The present invention relates to computer display systems, and more particularly to a method for displaying on-screen windows used in graphic user interface computer systems.

BACKGROUND OF THE INVENTION

Personal computer systems have been developed in a way to improve user convenience. One idea aimed at making the computer more accessible is the mouse. The mouse has attained fame as the pointing device, when it coupled with a graphical/menu-driven on-screen user interface. It allows a computer user to indicate what function he wants his computer to carry out by selecting from a list of commands presented as a menu. The user points at the menu selection by physically moving the pointing device, which causes a corresponding on-screen movement of the cursor. One or more buttons atop the device enables the user to indicate that he wants to select a menu item. The mouse is commonly connected with the computer through a serial port and it is called serial mouse. The whole process of moving the mouse and its on-screen representation is termed dragging the mouse.

Further, most operating systems adopting the graphic user interface (GUI) provides an on-screen window in which many of its elements appear graphically and many features are immediately available as on-screen choices through mouse operation. An application window may include a document window that is being the place where typing can be carried out. This windowing method is one of the most common features of today's multitasking systems. Each task is given an area of the screen dedicated to its own operations and images. The windowing operations can be strictly software manipulations or the graphic chip may include special hardware provisions for streaming the control of the windows. In an earlier windowing system, software controls the display of each window. The layout of the screen is calculated, and the proper values for each pixel are plugged into the appropriate locations in the memory map. The image is generated by reading each memory location in sequence and using the information it contains to control the intensity of the electron beam in the display as it sweeps down the screen.

As apparent, these control buttons are designed to place generally on the right corner of each window, provided that the mouse is manipulated by the right hand. Thus, this window arrangement is essentially suitable for the right-hand mouse user. However, if the user came to use the mouse with the left hand, and the mouse setting has been made for the left hand, pointing the window buttons may be inconvenient since the mouse should be turned to the right. Also, moving the mouse toward the right causes encounter with main body of the computer, thereby blocking the movement of the mouse and leading to unsuccessful pointing operation.

U.S. Pat. No. 5,402,152 for a Method and Apparatus For Tailoring Scroll Bar and Cursor Appearance to Pen User Hand Orientation to Needham discloses a pen based computer where a user enters the handedness of the user and the scroll bars are repositioned with respect to the display window to allow a user to more conveniently access the scroll functions. Thus, if the user is left handed, the user enters this information into the computer and the scroll bars will appear to the left of the display windows. If the user inputs that he is right handed, the computer places the scroll bars to the right of the display windows.

However, I have not seen an arrangement where the control buttons in addition to the scroll bars are repositioned based on the handedness of the user. These control buttons include iconize button, close button, and maximize button. What is needed is a computer that repositions both control buttons and scroll bars depending on the handedness of the user.

SUMMARY OF THE INVENTION

The present invention is intended to solve the aforementioned problems, and it is therefore an object of the invention to provide a method for displaying on-screen windows, which is convenient for a user to point the window control buttons by the left-hand mouse.

It is also an object to reposition the control buttons (iconize button, maximize button, and close button) based on the handedness of a user.

It is also an object to allow the user to enter the handedness of the user by using mouse buttons in order to reposition the control buttons and the scroll bars.

In accordance with the present invention, a method for displaying on-screen windows is provided, in which the method is carried out in a computer system using a mouse device, the method comprising the steps of determining whether the mouse button setting has been made for the right-hand operating mode or the left-hand operating mode; and creating a left-hand mode window in which control buttons thereof are placed generally at the left side of windows if the mouse button setting is for the left-hand mode.

The method further comprises the step of creating a window in which control buttons thereof are placed generally at the right side of the window, if the mouse button has set for the right-hand mode.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 2:
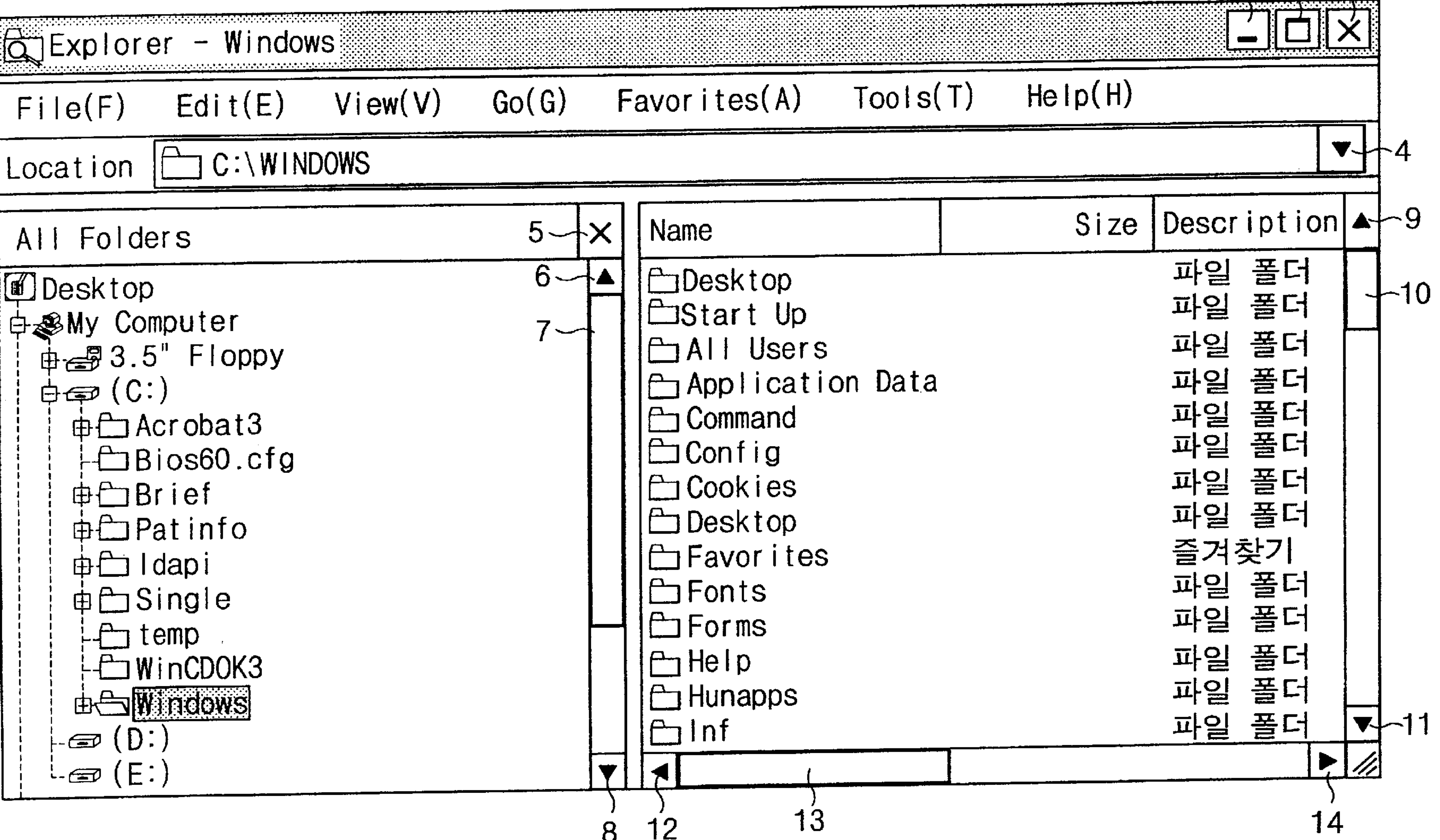
FIG. 2 is a view illustrating a window for a right handed user in accordance with the present invention.

In such a window many control buttons are provided so as to change features of the window or to effect choice such as maximizing the window size, closing the window, scrolling contents of the window, and so forth. A window is illustrated in FIG. 2 for the purpose of showing scroll bars and control buttons on the right hand side of a display for a right handed user. The window, generally denoted by reference number 100, is that of the "Windows Explorer" included in the Microsoft (r) Windows 98. The Explorer window 100 has iconize button 1, maximize button 2, close button 3, up-down scroll buttons 4, 6, 8, 9, and 11, left-right scroll buttons 12 and 14, vertical scroll bars 7 and 10, and horizontal scroll bar 13. Also, reference numeral 42 denotes a mouse pointer.

Figure 1:
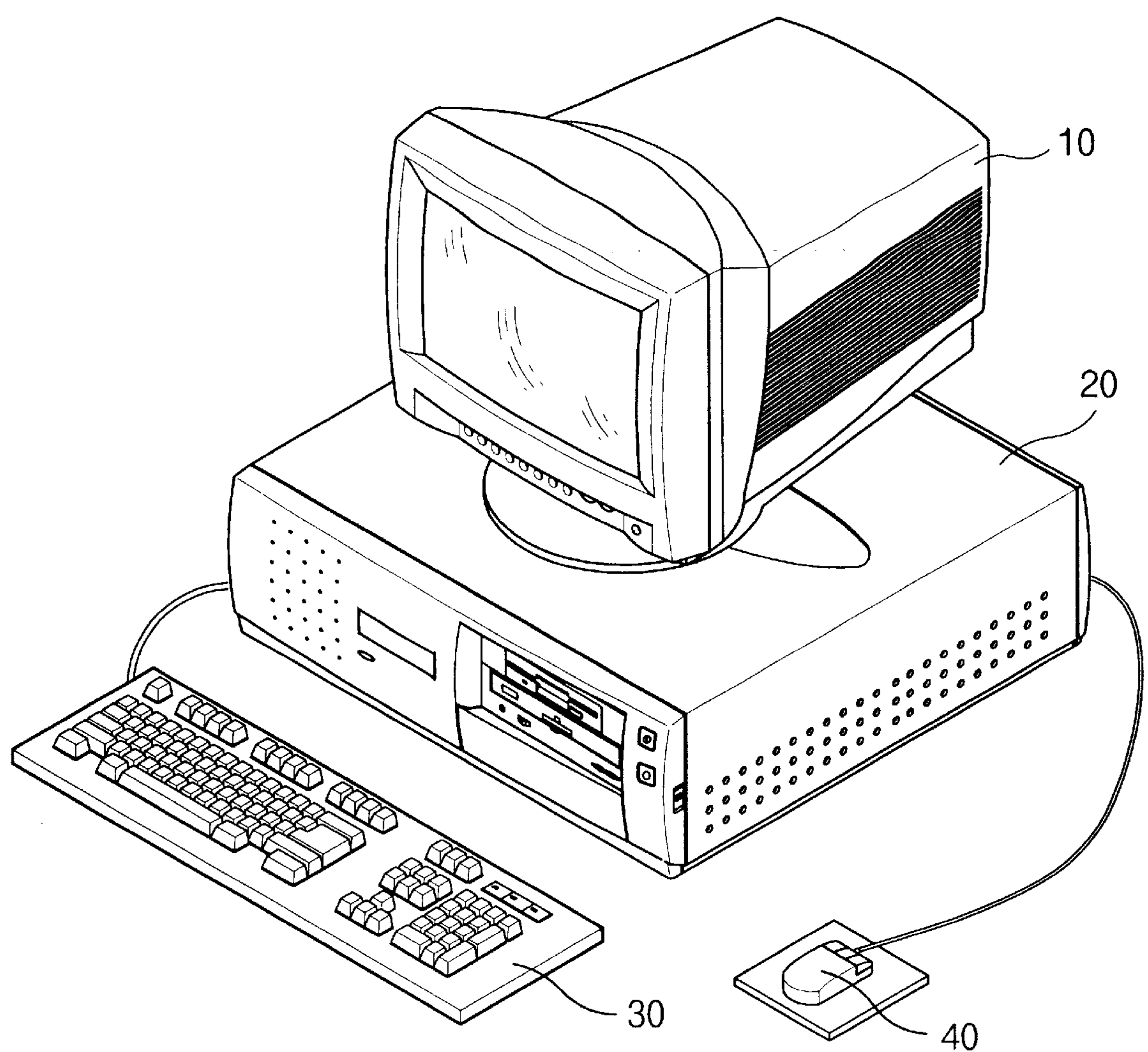
FIG. 1 is a perspective view showing a computer system having a mouse device.

Referring to FIG. 1, there is shown a computer system suitable for adopting a new window creation method in accordance with the present invention. The computer includes a desk-type main body 20 housing the system components, a display monitor 10, a keyboard 30 and a mouse 40 as input devices. The mouse 40 is usually located in the right side of the keyboard 30, but the mouse 40 can be used with its location being at the left side of the keyboard 30 because of space limit of the computer desk.

The personal computer operates in the graphic user interface environment by using common operating system such as Windows 95, Windows 98, Windows NT, X-Windows, Windows ME and OS/2. The operating system provides on-screen windows through the computer monitor 10. The windowing operations according to this invention can be software manipulations in the operating system as well as an application program. Thus software controls the display of each window. This invention is directed to a method for displaying the on-screen window adapted to the left-hand mouse environment.

Figure 3:
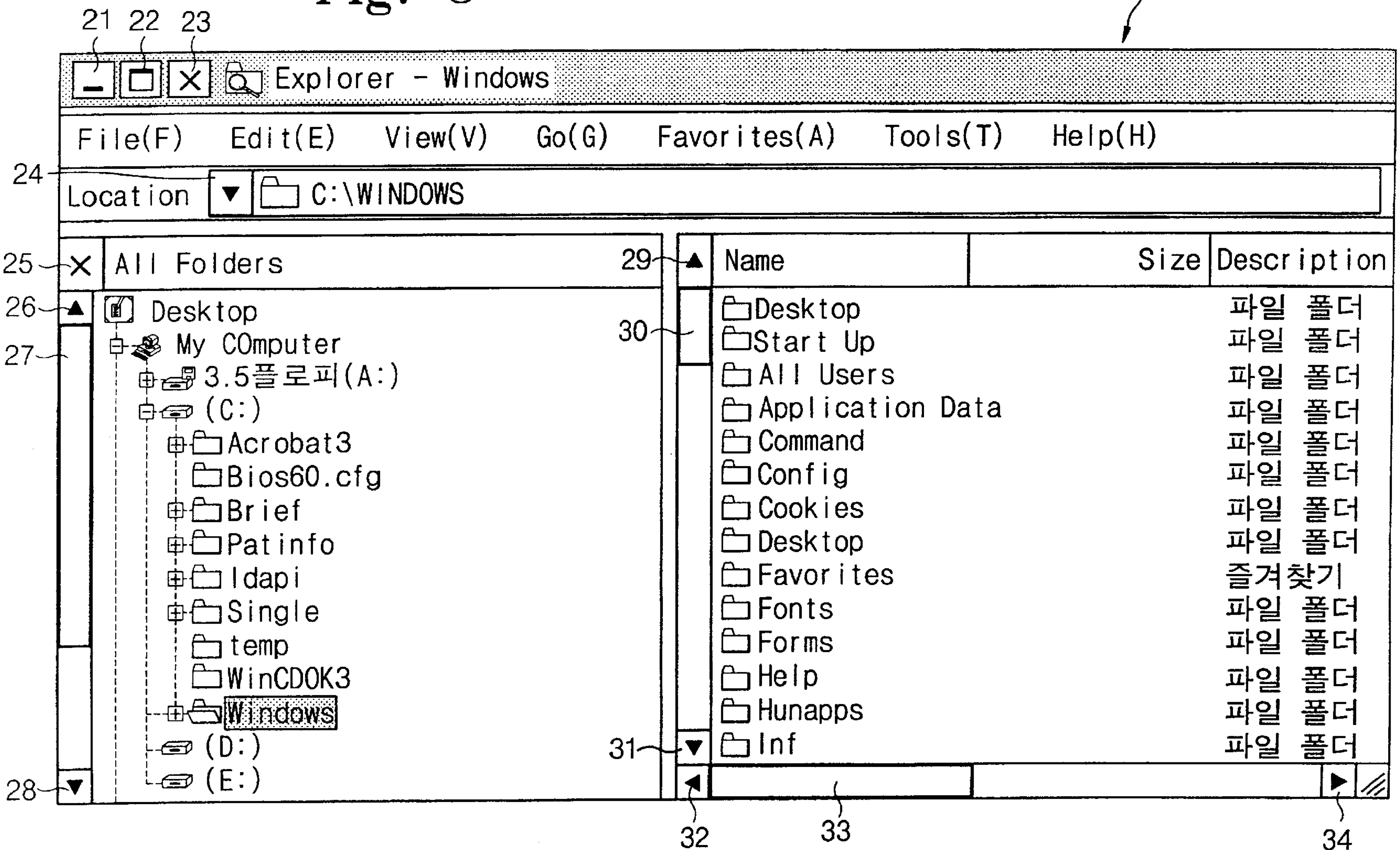
FIG. 3 is a view similar to that of FIG. 2, illustrating a window for the left-handed mouse in accordance with the present invention.

FIG. 3 illustrates an on-screen window of an application program displayed in the monitor 10 in accordance with the present invention. This window, generally denoted by reference number 200, depicts the WINDOWS EXPLORER included in the Microsoft (r) Windows 98. Particularly, the Explorer window 200 has a plurality of control buttons generally located at the left side of windows. These buttons include iconize button 21, maximize button 22, close button 23, up-down scroll buttons 26, 28, 30, and 31, left-right scroll buttons 32 and 34, vertical scroll bars 27 and 30, and horizontal scroll bar 33.

As apparent, these control buttons are placed on the left side or the upper-left corner of each window, provided that the mouse setting has been done for the left hand and it is manipulated by the left hand. Thus, this window arrangement is suitable for the left-hand mouse user since the control buttons are generally placed at the left side of windows and secondly it is free to move the mouse to turn to the left. With this, moving operation of the left-hand mouse and its on-screen pointer is convenient and thus successful pointing operation is possible.

Figure 4:
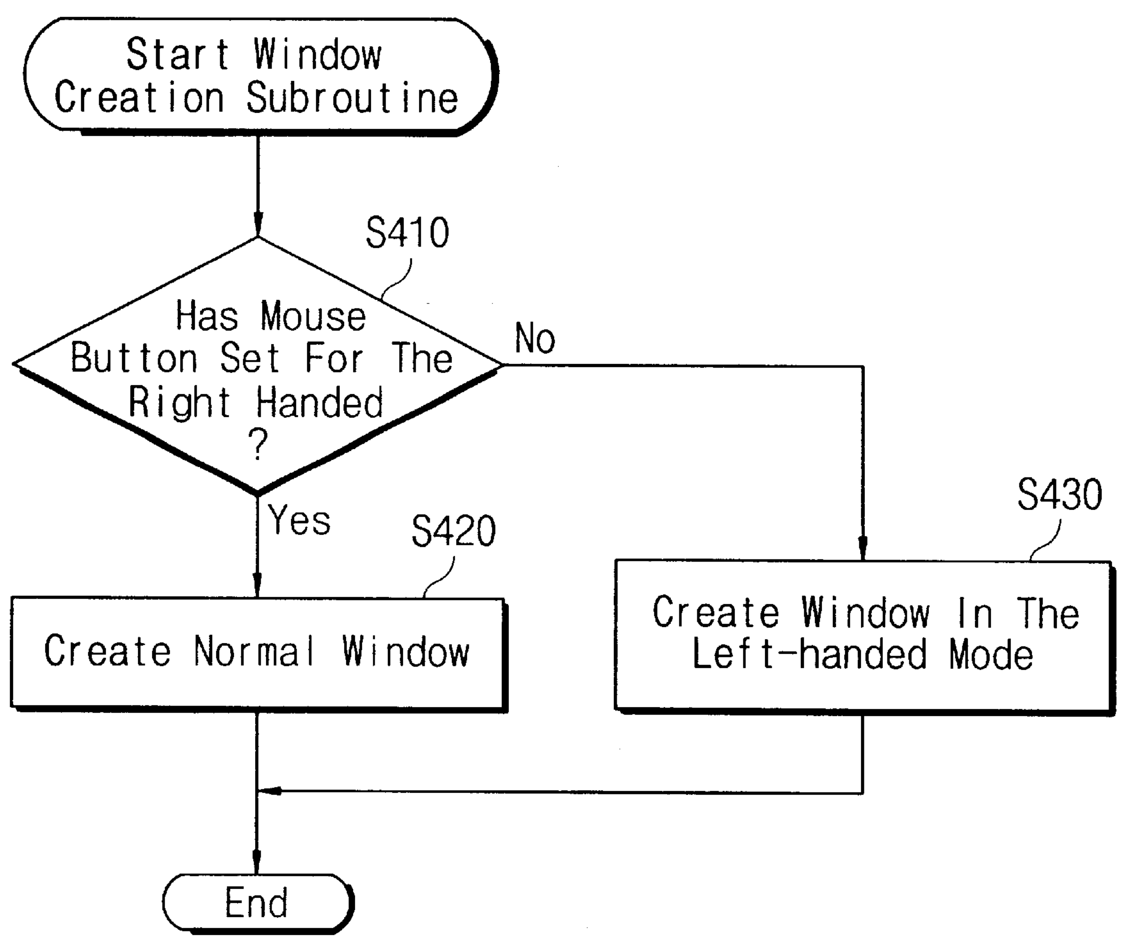
FIG. 4 is a flow diagram for showing a window creation method being carried out in an operating system kernel as well as an application program.

FIG. 4 shows a window creation method being carried out in the operating system kernel. It is presumed that the mouse setting information for the left-hand mode has been stored in the registry of the Windows 98 operating system. Conventionally, in the above operating systems, a user can swap the functions of the two mouse buttons by entering the control panel, clicking on the Mouse icon, choosing either "Right-handed" or "Left-handed" on the "Buttons" tab. What distinguishes this invention from conventional personal computer Windows operating systems is that when the user chooses between "Right-handed" or "Left-handed" in the Mouse icon, not only are the buttons for the mouse swapped, but the justification of the scroll bars, the scroll buttons, the iconize buttons, the close buttons and the maximize buttons for all Windows applications are also changed along with the mouse buttons between right-handed mode as illustrated in FIG. 2 and left-handed mode as illustrated in FIG. 3. This is accomplished by a subroutine provided in the kernel of the operating system. When the operating system displays the windows, it checks the registry for the mouse settings and creates a desired window for the right-hand mode or the left-hand mode. A subroutine is provided in the kernel of the operating system to achieve the above-noted operation.

When the window creation subroutine is started, the operating system determines whether the mouse button has been set for the right hand at step 410. If the mouse setting is for the right-hand mode, the operating system creates normal windows at step 420, in which the control buttons thereof are placed generally at the right side of the window.

While, if the mouse setting is for the left-hand mode, it proceeds to step 430 to allow the opening system to create the left-hand mode window in which the control buttons thereof are placed generally at the left side of the window as like the window shown in FIG. 3. When the desired window is displayed, the subroutine is ended.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A computer running in a Windows operating system, comprising:

a bus transferring data;

an input device coupled to said bus entering said data;

a microprocessor coupled to said bus processing said data;

a display configuring a display window by positioning control buttons on a left hand side of said display window if a user has set mouse control buttons for left-handed use and positioning control buttons on a right hand side of said display window if a user has set mouse control buttons for right-handed use; and a subroutine in a kernel of said Windows operating system causing scroll bars and control buttons to be left justified or right justified when said mouse buttons are set to left handed or right handed respectively.

2. The computer of claim 1, wherein said control buttons comprise scroll buttons, maximize buttons, close window buttons and iconize buttons.

3. A personal computer running in Windows operating system, comprising:

a central processing unit for controlling the overall functions of said computer;

a bus for transferring data;

a display electronically connected to said computer displaying Windows in right handed mode and left handed mode depending on whether a user has previously set mouse buttons for right-handed or left-handed use, respectively, said Windows in right handed mode each having a scroll tab and scroll up and scroll down buttons on a right side of each window and having iconize, close window and maximize window control buttons at said right side of each window, said Windows in left handed mode having a scroll tab and scroll up and scroll down buttons on a left side of each window and having iconize, close window and maximize window control buttons at said left side of each window; and a subroutine in a kernel of said Windows operating system causing scroll bars, scroll buttons, iconize buttons, close Windows buttons and maximize Windows buttons to be left justified or right justified when said mouse buttons are set to left handed or right handed respectively.

4. The computer of claim 3, said iconize, said close window and said maximize window control buttons being on top of each window but positioned as far to the right of each window as possible when said mouse buttons are set to right handed mode and said iconize, said close window and said maximize window control buttons being on top of each window but positioned as far to the left of each window as possible when said mouse buttons are set to left handed mode.

5. The computer of claim 3, further comprising a mouse comprising a left mouse button and a right mouse button and a track ball serving to move a cursor across said display, said mouse buttons used to open and close applications, including windows, said mouse providing said computer input from said user whether to display said windows in said left handed mode or said right handed mode.

* * * * *